Feb. 1, 1966    H. LANGFELDER    3,232,563
SPOILER ARRANGEMENT

Filed Nov. 19, 1963    2 Sheets-Sheet 1

INVENTOR.
Helmut Langfelder
BY
Michael J. Striker

Feb. 1, 1966  H. LANGFELDER  3,232,563
SPOILER ARRANGEMENT
Filed Nov. 19, 1963  2 Sheets-Sheet 2
Fig. 5
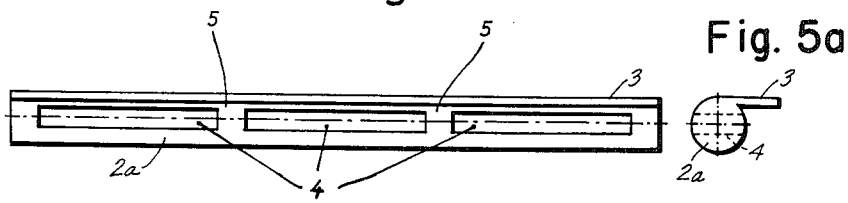
Fig. 5a
Fig. 6
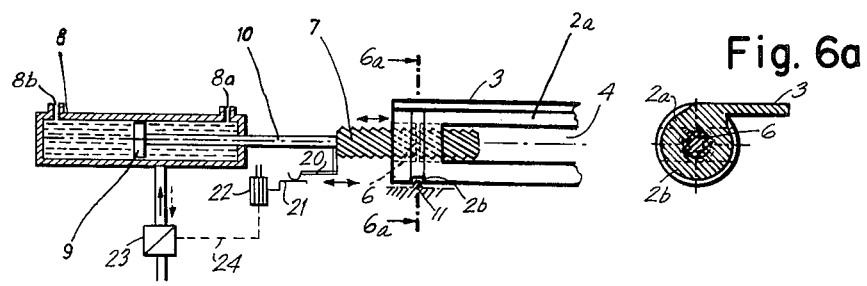
Fig. 6a
Fig. 7
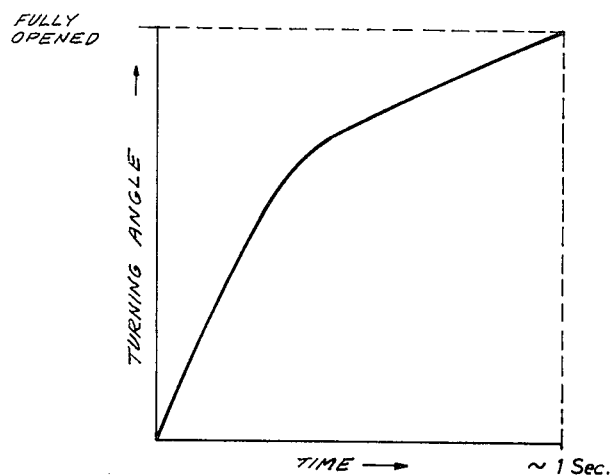
INVENTOR.
Helmut Langfelder
BY
Michael J. Striker
Atty

United States Patent Office 3,232,563
Patented Feb. 1, 1966

3,232,563
SPOILER ARRANGEMENT
Helmut Langfelder, Munich, Germany, assignor to
Messerschmitt A.G., Augsburg, Germany
Filed Nov. 19, 1963, Ser. No. 324,623
Claims priority, application Germany, Nov. 21, 1962,
M 54,893
17 Claims. (Cl. 244—42)

The present invention relates to a spoiler arrangement, and more particularly to a spoiler arrangement for an aircraft wing designed for supersonic speed.

Spoilers are used on wings of aircraft to produce a transverse steering effect. However, the known spoiler arrangements have only a limited effect in the supersonic speed range, since the compression produced by the spoiler is at least partly equalized by the lower pressure behind the spoiler. The lower pressure also causes a delay of the transverse steering effect after actuation of the spoiler.

It is one object of the present invention to overcome this disadvantage of known spoiler constructions, and to provide a spoiler arrangement in which the reduced pressure rearwardly of the spoiler is automatically increased.

Another object of the present invention is to provide a spoiler arrangement which produces a steering effect without any delay after actuation of the spoiler.

Another object of the invention is to prevent fluttering of the wings, and deformation of the wings caused by the unbalanced pressure conditions produced on the wing surface by the known spoilers.

Another object of the invention is to provide a spoiler construction which avoids aero-elastic disturbances in the low pressure area.

With these objects in view, the present invention relates to a spoiler arrangement for an aircraft, particularly for an aircraft intended to operate at supersonic speed. In accordance with one embodiment of the invention, a foil portion of the aircraft which has first and second surfaces on opposite sides is provided with spoiler means which are movable between an inoperative position, and an operative position projecting from the first surface and forming a passage between the first and second surfaces.

In the preferred embodiment of the invention, a spoiler means includes a cylindrical valve portion mounted in a corresponding cavity of the aircraft wing and having a projecting spoiler portion which is located in a recess of the wing surface when the spoiler means is inoperative. In the operative position of the spoiler means, the spoiler portion projects from the top surface of the wing. The cylindrical valve portion is formed with a passage connecting the top and bottom surfaces of the wing. The cylindrical valve portion is mounted for turning movement in a corresponding cylindrical cavity in the wing, the cavity having elongated rectangular ports opening on the top and bottom surfaces of the wing, and registering with the passage in the cylindrical valve portion when the spoiler means is in the operative position.

Preferably, operating means are provided for turning the spoiler means at a varying speed, which may be accomplished by a variable speed hydraulic motor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 5 is a front view of a spoiler means according to the invention;

FIG. 5a is a side view of a spoiler means according to the invention;

FIG. 6 is a fragmentary front view of a spoiler arrangement according to the invention, and including a schematic illustration of a hydraulic operating and actuating means for the spoiler means;

FIG. 6a is a cross-sectional view taken on line 5a–6a in FIG. 6; and

FIG. 7 is a diagram graphically illustrating the angular displacement of the spoiler means of the embodiment of FIG. 6 depending on the time.

Figure 1:
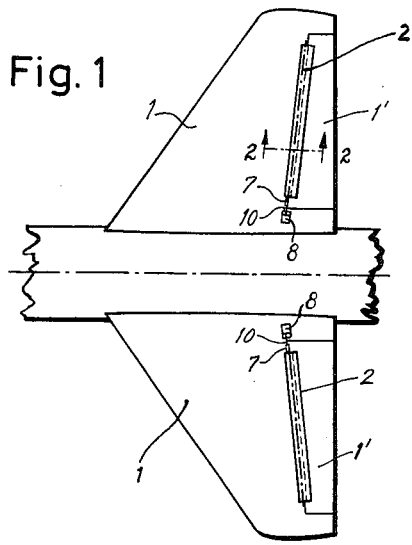
FIG. 1 is a fragmentary plan view illustrating the wings of an aircraft provided with a spoiler arrangement according to the invention.

Referring now to the drawings, and more particularly to FIG. 1, spoiler means 2 and a hydraulic motor 8 connected by a rod 10 to spoiler means 2 are mounted on the wings 1 of an aircraft near the trailing edges of the wings which have a shape suitable for supersonic speeds. A rear portion 1' of the wing is detachable to permit the mounting of the spoiler means in a cavity of the wing.

Figure 2:
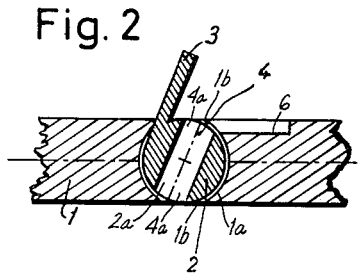
FIG. 2 is a fragmentary cross-sectional view on line 2—2 in FIG. 1 and illustrating the spoiler arrangement in an operative position on an enlarged scale.
Figure 3:
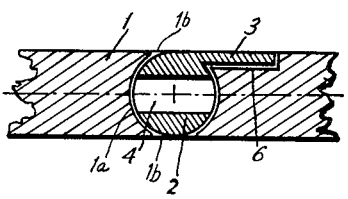
FIG. 3 is a cross-sectional view corresponding to FIG. 2 and illustrating the spoiler arrangement in an inoperative position.

As best seen in FIGS. 2 and 3, each spoiler means includes a cylindrical valve portion 2a, and a spoiler portion 3 which is plate-shaped and projects in tangential direction from the cylindrical portion 2a.

Valve portion 2a is formed with a diametrical passage 4 which opens on the surface of the cylindrical portion in two substantially rectangular diametrically located openings 4a.

The cylindrical portion 2a is located in a corresponding cylindrical cavity 1a in the wing which extends to the top and bottom surfaces of the wing and opens on the same in openings or ports 1b.

In the operative position of the spoiler means shown in FIG. 2, the spoiler portion 3 projects from the top surface of the wing, and the openings 4a of passage 4 register with the ports 1b of cavity 1a so that air can flow through passage 4 from the bottom surface to the top surface of the wing. In the inoperative position shown in FIG. 3, spoiler portion 3 is located in the recess 6, and passage 4 extends transversely to the passage formed by the cavity 1a and ports 1b so that no air can flow through the passage. The spoiler portion 3 has its top surface flush with the top surface of the wing to cause no air disturbance, and the outer surface of the valve portion 2a is preferably not exactly cylindrical but has in the region of ports 1b such a curvature as to be flush with the top and bottom surface of the wing in the inoperative position shown in FIG. 3 or during the movement from the inoperative to the operative position.

Figures 4A, 4B, 4C:
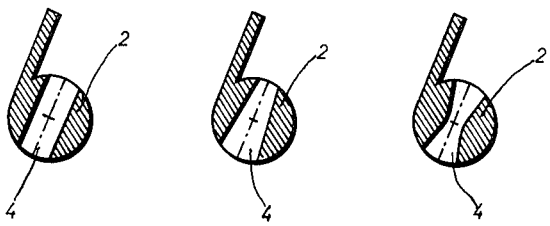
FIG. 4a, FIG. 4b and FIG. 4c are cross-sectional views illustrating different spoiler constructions.

FIGS. 2, 3 and 4a illustrate a spoiler means provided with a passage 4 which is bounded by opposite parallel walls. In the modified construction shown in FIG. 4b, the cross-section of passage 4 decreases from the bottom surface to the top surface of the wing, and in the modification of FIG. 4c, the passage has the shape of a Laval nozzle, and resembles in cross-section a venturi tube. However, all illustrated modifications of passage 4 have passages bounded by elongated opposite wall surface extending in direction of the wing.

The amount and pressure of air passing through the passage depends on the angular displacement of spoiler means 2, and more particularly on the angular position of the spoiler portion 3. In an intermediate position between the position of FIG. 3 and the position of FIG. 2, passage 4 will be partly closed, corresponding to a less projecting position of spoiler 3. The modifications illustrated in FIGS. 4a, 4b and 4c permit further adaptation of the spoiler arrangement to required pressure conditions since the shape of the passage has an influence of the amount of air flowing through the passage in the several angularly displaced positions of the spoiler means. When the spoiler 3 is in an operative position, the air in front of it is compressed, while negative pressure develops behind the spoiler 3. The negative pressure is compensated by air flowing through passage 4 so that the spoiler is fully effective and causes without delay a transverse steering effect.

The spoiler is turned by operating means which include an electric or hydraulic motor, and a transmission between the motor and the spoiler. A preferred embodiment of the invention is illustrated in FIGS. 6 and 6a. A hydraulic motor including a cylinder 8 and a piston 9 drives through a piston rod 10 a threaded spindle 7 which meshes with an inner thread or nut means 6 at one end of the cylinder spoiler portion 2a. As is clearly shown in FIGURE 6, the elongated opening 4a of passage 4 is of rectangular shape and has an end spaced from the end of the cylinder spoiler portion 2a. As best seen in FIG. 5, three passages 4 are advantageously provided in one elongated cylindrical spoiler portion and are separated by walls 5, which increase the rigidity of the cylindrical spoiler portion.

The end of the cylindrical spoiler portion which has an inner thread and constitutes a nut means 6, is provided with a peripheral groove 2b into which a segment shaped projection 11 provided in the cavity 1a of wing 1 projects so that the sliding connection 11, 2b constitutes a thrust bearing supporting the spoiler means against the axial pressure exerted by the hydraulic piston 9.

Preferably, the spoiler is turned slower when approaching its fully actuated position and in such a manner that the conditions illustrated in FIG. 7 are achieved. The horizontal axis represents time, and the vertical axis represents the turning angle of the spoiler means. After one second, the spoiler is completely opened and assumes its operative position shown in FIG. 2. At the beginning of the turning movement the spoiler should turn more rapidly and at the end of the turning the spoiler should turn more slowly as indicated by the graph in FIG. 7 so that the desired spoiler position can be more accurately adjusted when the spoiler is near its completely open position.

The varying turning speed of the spoiler means is accomplished by varying the speed of piston 9. As shown in FIG. 6, an actuator arm 20 on spindle 7 engages in a predetermined position of spindle 7, and arm 21 and operates the same to close a switch, not shown, by which a relay 22 is energized. Relay 22 operates a valve 23 through a mechanical linkage 249 schematically indicated in FIG. 6 so that oil is discharged from cylinder 8 whereby the movement of the piston by oil admitted through opening 8a is slowed down. The oil in the other cylinder chamber is discharged through opening 8b. In this manner the turning speed of the spoiler means is decreased.

It will be understood that each of the elements described above, or two or more together, may also find a useful application in other types of spoiler arrangements, differing from the types described above.

While the invention has been illustrated and described as embodied in a spoiler device including a cylindrical portion with a passage connecting the surfaces of the wing of a supersonic aircraft, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art, fairly constitute essential characteristics of the generic or specific aspects of this invention and, therefore such adaptations should and are intended to be comprehended within the meaning and range of equivalence of the following claims.

What is claimed as new and described to be secured by Letters Patent is:

1. A spoiler arrangement for aircraft, comprising, in combination,
   a wing portion of the aircraft having a top surface and a bottom surface, said wing having a cavity opening on said top and bottom surfaces to form elongated ports;
   and spoiler means including a cylindrical portion mounted in said cavity for turning movement and a spoiler portion projecting from said cylindrical portion in tangential direction, said spoiler means having an inoperative angular position in which said spoiler portion is substantially flush with said top surface of said wing, and an operative angular position in which said spoiler portion projects from said top surface, said cylindrical portion having a diametrical passage therethrough disposed to connect in said operative position said ports to permit the flow of air between said bottom top surfaces.

2. A spoiler arrangement for aircraft, comprising, in combination,
   a wing of the aircraft having a top surface and a bottom surface, said wing having a cavity opening on said top and bottom surfaces to form elongated ports;
   and spoiler means including a cylindrical portion mounted in said cavity for turning movement and a spoiler portion projecting from said cylindrical portion in tangential direction, said spoiler means having an inoperative angular position in which said spoiler portion is substantially flush with said top surface of said wing, and an operative angular position in which said spoiler portion projects from said top surface, said cylindrical portion having a diametrical passage therethrough disposed to connect in said operative position said ports to permit the flow of air between said bottom and top surfaces, said passage having parallel opposite walls.

3. A spoiler arrangement for aircraft, comprising, in combination,
   a wing of the aircraft having a top surface and a bottom surface, said wing having a cavity opening on said top and bottom surfaces to form elongated ports;
   and spoiler means including a cylindrical portion mounted in said cavity for turning movement and a spoiler portion projecting from said cylindrical portion in tangential direction, said spoiler means having an inoperative angular position in which said spoiler portion is substantially flush with said top surface of said wing, and an operative angular position in which said spoiler portion projects from said top surface, said cylindrical portion having a diametrical passage therethrough disposed to connect in said operative position said ports to permit the flow of air between said bottom and top surfaces, said passage having a cross-section gradually decreasing from said bottom surface to said top surface.

4. A spoiler arrangement for aircraft, comprising, in combination,
   a wing of the aircraft having a top surface and a bottom surface, said wing having a cavity opening on said top and bottom surfaces to form elongated ports;
   and spoiler means including a cylindrical portion mounted in said cavity for turning movement and a spoiler portion projecting from said cylindrical portion in tangential direction, said spoiler means having an inoperative angular position in which said spoiler portion is substantially flush with said top surface of said wing, and an operative angular position in which said spoiler portion projects from said top surface, said cylindrical portion having a diametrical passage therethrough disposed to connect in said operative position said ports to permit the flow of air between said bottom and top surfaces, said passage having the shape of a Laval nozzle.

5. A spoiler arrangement for aircraft, comprising, in combination, a wing of the aircraft having a top surface and a bottom surface, said wing having a cavity opening on said top and bottom surfaces to form elongated ports, and being formed with an elongated recess adjacent the port in said top surface;

and spoiler means including a cylindrical portion mounted in said cavity for turning movement and a spoiler portion projecting from said cylindrical portion in tangential direction, said spoiler means having an inoperative angular position in which said spoiler portion is located in said recess substantially flush with said top surface of said wing, and an operative angular position in which said spoiler portion projects from said top surface, said cylindrical portion having a diametrical passage therethrough disposed to connect in said operative position said ports to permit the flow of air between said bottom and top surfaces.

6. A spoiler arrangement for aircraft, comprising, in combination, a wing of the aircraft having a top surface and a bottom surface, said wing having a cylindrical cavity opening on said top and bottom surfaces to form elongated ports;

and spoiler means including a cylindrical portion mounted in said cylindrical cavity for turning movement and a spoiler portion projecting from said cylindrical portion in tangential direction, said spoiler means having an inoperative angular position in which said spoiler portion is substantially flush with said top surface of said wing, and an operative angular position in which said spoiler portion projects from said top surface, said cylindrical portion having surface portions located in said inoperative position in said ports and having such a curvature as to be flush with said top and bottom surfaces, said cylindrical portion having a diametrical passage therethrough disposed to connect in said operative position said ports to permit the flow of air between said bottom and top surfaces.

7. A spoiler arrangement for aircraft, comprising, in combination, a wing of the aircraft having a top surface and a bottom surface, said wing having a cylindrical cavity opening on said top and bottom surfaces to form elongated ports, and being formed with an elongated recess adjacent the port in said top surfaces;

and spoiler means including a cylindrical portion mounted in said cylindrical cavity for turning movement and a spoiler portion projecting from said cylindrical portion in tangential direction, said spoiler means having an inoperative angular position in which said spoiler portion is located in said recess substantially flush with said top surface of said wing, and an operative angular position in which said spoiler portion projects from said top surface, said cylindrical portion having surface portions located in said inoperative position in said ports and having such a curvature as to be flush with said top and bottom surfaces, said cylindrical portion having a diametrical passage therethrough disposed to connect in said operative position said ports to permit the flow of air between said bottom and top surfaces.

8. A spoiler arrangement as set forth in claim 1 and including operating means for turning said spoiler means at variable speed.

9. A spoiler arrangement as set forth in claim 1, said ports in said top and bottom surfaces having a substantially rectangular shape, and wherein said diametrical passage has substantially rectangular diametrically disposed openings registering with said ports in said operative position.

10. A spoiler arrangement as set forth in claim 1 and including a nut means secured to said cylindrical portion coaxial therewith, threaded means meshing with said nut means, and means for moving said threaded means in axial direction.

11. A spoiler arrangement as set forth in claim 10 wherein said moving means includes a hydraulic motor, and comprising means controlled by said threaded means for varying the supply of oil to said hydraulic motor so that said spoiler means turns at a varying speed.

12. A spoiler arrangement for an aircraft, comprising, in combination, a foil portion of said aircraft having first and second surfaces formed with opposite openings and having a cavity between said openings; and spoiler means having a valve portion provided with a through passage and a spoiler portion projecting from said valve portion, said valve portion being journaled in said cavity for movement between an inoperative position closing said openings and an operative position in which said spoiler portion projects from said first surface at the leading part of said opening therein and a passage of said valve portion establishes communication between said opening in said second surface and the part of the opening in the first surface trailing said spoiler portion, the axis of said passage being substantially parallel to a surface of said spoiler portion.

13. A spoiler arangement for an aircraft, comprising, in combination, a foil portion of said aircraft having first and second surfaces formed with opposite openings and having a cavity between said openings; and spoiler means having a valve portion provided with a through passage and a spoiler portion projecting from said valve portion, said valve portion being journalled in said cavity for said valve portion being journalled in said cavity for movement between an inoperative position closing said openings and an operative position in which said spoiler portion projects from said first surface at the leading port of said opening therein, and the passage of said valve portion establishes communication between said opening in said second surface and the part of the opening in the first surface trailing said spoiler portion.

14. A spoiler arrangement for an aircraft, comprising, in combination, a foil portion of said aircraft having first and second surfaces formed with opposite openings and having a cavity between said openings; and spoiler means having a valve portion provided with a through passage and a spoiler portion projecting from said valve portion, said spoiler means being journalled in said cavity for movement between an inoperative position closing said openings and an operative position in which said spoiler portion projects from said first surface at the leading part of said opening therein, and said passage establishes communicattion between said opening in said second surface and the part of the opening in the first surface trailing said spoiler portion.

15. A spoiler arrangement for an aircraft, comprising, in combination, a foil portion of said aircraft having first and second surfaces formed with opposite openings and having a cavity between said openings; and spoiler means having a cylindrical valve portion having a passage therein and a spoiler portion tangentially projecting from said valve portion, said cylindrical valve portion being mounted in said cylindrical cavity for turning movement between an inoperative position closing said openings and an operative position in which said spoiler portion projects from said first surface at the leading part of said opening therein, and said valve passage establishes communication between said opening in said second surface and the part of the opening in the first surface trailing the spoiler portion.

16. A spoiler arrangement for an aircraft, comprising, in combination, a foil portion of said aircraft having first and second surfaces formed with opposite openings and having a cavity between said openings; and spoiler means having a valve portion provided with a through passage, and a spoiler portion projecting from said valve portion, said valve portion being journalled, in said cavity for movement between an inoperative position closing said openings and an operative position in which said spoiler portion projects from said first surface at the leading part of said opening therein and said passage of said valve portion establishes communication between said opening in said second surface and the part of the opening in the first surface trailing the spoiler portion, the surface of said valve portion having such a curvature as to be flush with said second surface during movement between said operative and inoperative portions.

17. A spoiler arangement for an aircraft, comprising, in combination, a foil portion of said aircraft having first and second surfaces formed with opposite openings and having a cavity between said openings; spoiler means having a valve portion provided with a through passage and a spoiler portion projecting from said valve portion, said valve portion being journalled in said cavity for movement between an inoperative position closing said openings and an operative position in which said spoiler portion projects from said first surface at the leading part of said opening therein, and the passage of said valve portion establishes communication between said opening in said second surface and the part of the opening in the first surface trailing said spoiler portion; and operating means for moving said spoiler means at a varying speed between said inoperative and operative positions.

References Cited by the Examiner

UNITED STATES PATENTS

| | | | |
|---|---|---|---|
| 1,829,616 | 10/1931 | Stalker. | |
| 1,962,390 | 6/1934 | Gerdes | 244—42 |
| 2,003,223 | 5/1935 | Rose | 244—42 |
| 2,041,688 | 5/1936 | Barnhart | 244—42 |
| 2,433,649 | 12/1947 | Clevenger et al. | 244—42 X |
| 2,987,277 | 6/1961 | Richardson | 244—42 X |

MILTON BUCHLER, *Primary Examiner.*

BERNARD BELKIN, *Assistant Examiner.*